United States Patent
Crawford

[15] 3,676,506
[45] July 11, 1972

[54] SYNTHESIS OF NOVEL COMPOUNDS USEFUL FOR PRODUCTION OF JUVABIONE

[72] Inventor: Robert J. Crawford, Wyoming, Ohio
[73] Assignee: The Procter & Gamble Company, Cincinnati, Ohio
[22] Filed: Dec. 29, 1969
[21] Appl. No.: 888,894

[52] U.S. Cl. .....................260/631.5, 260/468 R, 260/587, 260/665 R
[51] Int. Cl. .........................................................C07c 35/00
[58] Field of Search...................................260/631.5, 638 R

[56] References Cited

OTHER PUBLICATIONS

Morrison et al., Organic Chemistry, Allyn & Bacon, Boston, 1966, p. 848
Braude et al., J. Chem. Soc. (1951) 2078–2084
Nazarov et al., Chem. Abst. 51, 16317 b

*Primary Examiner*—Howard T. Mars
*Attorney*—Edmund J. Sease and Jack D. Schaeffer

[57] ABSTRACT

Disclosed herein are processes for the production of 6-methyl-2-(4-methylcyclohex-3-en-1-yl)hept-1-en-4-ol and 2-methyl-6-(4-methylcyclohex-3-en-1-yl)heptan-4-ol using metalated limonene as the starting reactant. The novel compounds of the invention are useful in the synthesis of juvabione, a product having juvenile hormone activity.

1 Claim, No Drawings

SYNTHESIS OF NOVEL COMPOUNDS USEFUL FOR PRODUCTION OF JUVABIONE

BACKGROUND OF THE INVENTION

This invention relates to the syntheses of two novel compounds which find use as intermediates in the production of juvabione.

Juvabione is a naturally occurring substance found in the extracts of various pulp woods, in particular the balsam fir, Abies balsamea and paper products derived therefrom.

It is reported by Bowers, Fales, Thompson, and Uebel in Science 154, 1020 (1966) that juvabione shows strong juvenile hormone activity in the hemipteran bug, Pyrrhocoris apterus. That is, when last-instar nymphs or immature insects are allowed to come in contact with the juvabione the insects undergo one or more supernumerary molts and eventually die without becoming sexually mature.

Such recent developments as that reported above by Bowers et al., supra have uncovered a new approach to the age old problem of controlling insects harmful to mankind. Previously a common and very successful method for eradicating insects involved the use of chemicals as combatants for the pests. Dichlorodiphenyltrichloroethane, or DDT, is one example from this class of pesticides that has found rather widespread use. However, the pesticides of this class have drawbacks that seriously impair their usefulness. For instance, they are toxic not only to the pests at which they are aimed but also to other insects not harmful to man. This lack of selectivity can be serious when one considers that not only the innocuous species of insects are being eradicated in addition to those insects that carry diseases harmful to man and affect man's food supply, but also the existence of insects that play an almost indispensable role, such as the part the bee plays in pollenation, is being threatened. Another shortcoming found in these chemicals is the fact that the insects soon become resistant to the chemical, e.g., within a few years mosquitoes, lice, houseflies, and other noxious insects adapted to DDT. This resistance was then met by the chemical industry with the development of other pesticides which could be used until the insects had built up an insensitivity to them also, and so on in what is seemingly an everlasting battle.

Recent work, however, has signalled what appears to be a whole new generation of pesticides. These pesticides are none other than the hormones that each particular insect secretes.

This new generation or class of pesticides comprises what has been called the juvenile hormone, a hormone that all insects secrete at certain stages in their lives. The juvenile hormone is one of three internal secretions used by insects to regulate growth and metamorphosis from larva to pupa to adult. This hormone is synthesized by two glands in the head of the insect which are also responsible for regulating the flow of the hormone into the blood. At certain stages in the development of the insect the hormone must be present, while at certain other stages it must be absent if the insect is to develop normally. For example, an immature larva has an absolute requirement for juvenile hormone if it is to progress through the usual larval stages. Then, in order for the mature larva to metamorphose into a sexually mature adult, the flow of hormones must stop. After full formation of the adult, the juvenile hormone must again be secreted. If the eggs or the insects come into contact with the hormone at times when it should be absent, the hormone readily enters the insect's system and provokes a lethal derangement of further development. The resultant effect is that the eggs fail to hatch or the immature insects die without reproducing themselves. For instance, as reported in the article by Bower et al. supra, when newly molted last-instar Pyrrhocoris apterus nymphs are topically treated with juvabione, a material having juvenile hormone activity, there results supernumerary molting to giant nymphs that are incapable of reproduction.

The problem to date has been the obtaining of large enough amounts of the juvenile hormones or compounds having juvenile hormone activity to effectively treat an insect-infested area. The compound juvabione, recently isolated from the North American balsam fir has, however, been found to possess juvenile hormone activity and further appears to affect only the insect Pyrrhocoris apterus. Such selectivity is, as pointed out previously, quite important to the ultimate solution of the insect control problem. Additionally, a further advantage is that insects will not find it easy to evolve a resistance or an insensitivity to their own hormone or, as with juvabione, a hormone analogue. The present invention lies in the discovery that the juvabione can be synthesized from a known and readily available material by a rather unexpectedly simple procedure.

SUMMARY OF THE INVENTION

Briefly stated, this invention concerns the discovery that juvabione can be synthesized through two novel intermediates with metalated limonene being the starting reagent.

Accordingly, one of the objects of the present invention is the synthesis of novel compounds useful for further syntheses to produce juvabione.

More specifically, an object of the present invention is the synthesis of 6-methyl-2-(4-methylcyclohex-3-en-1-yl)hept-1-en-4-ol.

Another object is a novel process for the production of 6-methyl-2-(4-methylcyclohex-3-en-1-yl)hept-1-en-4-ol.

A further object is the synthesis of 2-methyl-6-(4-methylcyclohex-3-en-1-yl)heptan-4-ol.

A still further object is a novel process for the production of 2-methyl-6-(C4-methylcyclohex-3-en-1-yl)heptan-4-ol.

Another object of the invention is a novel process for the synthesis of 2-methyl-6-(4-methylcyclohex-3-en-1-yl)heptan-4-one.

Another object is a novel process for the production of juvabione.

Still other objects will become apparent from a reading of the following discussion and examples.

DISCUSSION AND PREFERRED EXAMPLES

According to the present invention juvabione is synthesized from metalated limonene, 2-(4-methylcyclohex-3-en-1-yl)allyllithium. The synthesis of this metalated limonene is fully disclosed in Ser. No. 888,893, filed Dec. 29, 1969. As used in the aforementioned application as well as here, 2-(4-methylcyclohex-3-en-1-yl)allyllithium is referred to as metalated limonene.

As disclosed in the above-mentioned application, the readily available limonene is metalated to form a stable compound useful for the syntheses of various known products. Additionally it has been discovered that metalated limonene can be used as the starting reactant for the production of novel compounds with one field of utility being the synthesis of juvabione.

The widely distributed terpene limonene is a naturally occurring substance found in several essential oils, in some as the main constituent, especially in citrus oils. Limonene is found in optically active forms in both the levo- and dextro-rotatory forms as well as the optically inactive or racemic form known as dipentene. The optically inactive dl-limonene occurs in various wood turpentines, while d-limonene has been identified in oil of orange, lemon, mandarin, lime, grapefruit, bergamot, neroli, petitgrain, elemi, caraway, dill, fennel, celery, orthodon oils, etc. Separation of limonene from its natural sources is well known and need not be discussed here. Suffice it to say that dl-limonene and d-limonene are both commercially available.

It should be recognized that both optically active forms of limonene (d- and l-limonene) and the optically inactive form (dl-limonene or dipentene) undergo the same chemical reactions. The products derived from each form differ only in their optical activity. Thus, products obtained from optically active limonene are also optically active, while racemic limonene leads to optically inactive products. No loss of optical purity occurs during the conversion of d-limonene to the stable intermediate, metalated limonene, and subsequent conversion to the final product, i.e., racemization during the reactions does not occur. This feature is important in that the stereochemistry of the final product can be determined by the initial selection of the limonene. For instance, the stereochemistry of natural juvabione is important in regard to its degree of juvenile hormone activity in the linden bug, *Pyrrhocoris apterus*. Using the indicated numbering convention for the formula of juvabione,

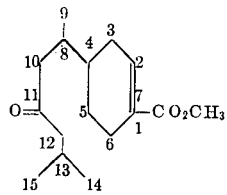

natural juvabione has 4R, 8S stereochemistry. Accordingly, d-limonene is preferably used in the metalation reaction since it leads to juvabione having the R configuration at C–4. dl-Limonene can also be used, in which case it would be necessary to separate the subsequently formed 4R and 4S stereoisomers to obtain maximum biological activity. Thus, the synthesis of juvabione having the same absolute stereochemistry as the naturally occurring juvabione by the present method using metalated limonene requires that preferably d-limonene be used in the metalation reaction, though it should be recognized that dl-limonene can also be used.

As disclosed in the aforementioned application Ser. No. 888,893, limonene is first metalated by use of a strong metalating agent to form metalated limonene. In the process of the present invention the metalated limonene is reacted with isovaleraldehyde to produce 6-methyl-2-(4-methylcyclohex-3-en-1-yl)hept-1-en-4-ol. A schematic illustration of the reactions involved, including the production of metalated limonene, is represented by the following:

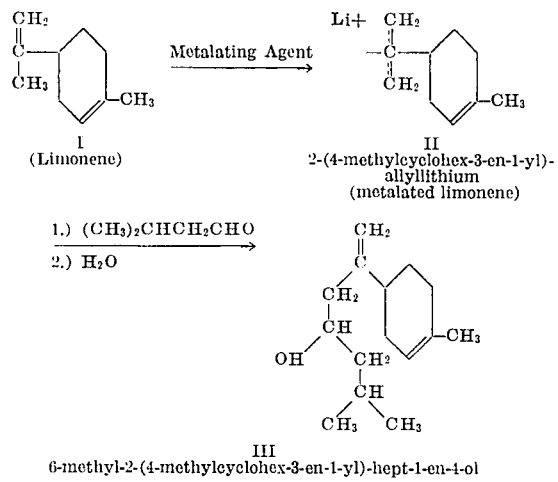

III
6-methyl-2-(4-methylcyclohex-3-en-1-yl)-hept-1-en-4-ol

The metalating agent used in the reaction with limonene comprises an organolithium-ditertiary amine complex. More specifically, the organolithium is any primary alkyllithium having two to 10 carbon atoms. The ditertiary amine is selected from those diamines having four or less carbon atoms between the two amino groups. The ratio ranges of organolithium to amine to limonene on a mole equivalent basis is 1:0.25–2:1–10. A temperature range of 25° to 70° C and reaction time of from 1 to 24 hours in suitable in the metalation reaction to produce compound II.

The formula assigned metalated limonene as represented by II has not been determined absolutely but is rather theorized to be correct. Further reactions of metalated limonene to form known compounds indicates that metalation does occur at the side chain double bond and that formula II would be correct. Another possibility as to the correct representation of metalated limonene is

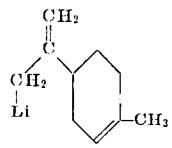

Regardless of the proper formula to be assigned the product, the 2-(4-methylcyclohex-3-en-1-yl)allyllithium that is formed is stable and can be stored indefinitely prior to further reaction with isovaleraldehyde. In going from metalated limonene to compound III no separation procedures are necessary. That is, any unreacted limonene or solvents involved in the metalation reaction do not have to be removed prior to the isovaleraldehyde addition. Any limonene or solvent carried over can be separated at a later step in the process along with final purification of the desired product.

After the metalation process has been completed the reaction vessel is fitted with a low temperature thermometer and a pressure equalized addition funnel. The solution is stirred and cooled while a blanket of inert gas is maintained over the solution as was done in the metalation reaction. The isovaleraldehyde is then added slowly with a resultant exothermic reaction occurring. The resulting product is next hydrolyzed with water to form compound III. The organic phase is then separated from the aqueous phase and washed with sodium chloride, e.g., 5 percent, hydrochloric acid, again aqueous sodium chloride, e.g., 5 percent, and finally dried and evaporated. Any unreacted limonene can be separated from the resulting liquid by distillation. Further distillation yields compound III as a colorless oil.

As previously mentioned, metalated limonene does not have to be separated from its reaction mixture prior to any further reactions, such as the addition of the reactant isovaleraldehyde as in the present invention. The solvents or concentrations used in the metalation reaction do not have to be altered before the aldehyde addition. As disclosed in the aforementioned application covering metalated limonene, the amount of solvent used can vary so as to give concentrations of 2.0 to 0.1 molar based on the organolithium reagent prior to any amine or limonene additions. The solvent can be the alkanes having five to 10 carbon atoms or the cycloalkanes having five to 10 carbon atoms.

The metalated limonene-isovaleraldehyde reaction takes place instantaneously even at low temperatures. Temperatures as high as the boiling point of the solvent can be employed at atmospheric pressure. However, it is preferred that the temperature be maintained in the range of −70° to 25° C. The most preferred reaction temperature range is −70° to −20° C.

The reaction with the metalated limonene is preferably maintained under a blanket of inert gas to prevent the formation of by-products resulting from reactions with oxygen or moisture in the atmosphere. Nitrogen and argon are two examples of gases that can be used, though certainly not exhaustive of the inert gases that are suitable. A primary consideration is that the gas blanket be inert.

The preferred mole ratio range of isovaleraldehyde to metalated limonene is 1–2:1. No advantage is realized from a greater mole ratio, though it is possible to do so with unreacted isovaleraldehyde being recovered at a subsequent step.

The addition of water to hydrolyze the initial reaction product of the metalated limonene-isovaleraldhyde reaction to compound III is mildly exothermic so that external cooling may be necessary during this hydrolysis reaction. Temperatures higher than the boiling point of any solvent or reactants should preferably be avoided. The preferred temperature range for this reaction is 0° to 70° C. 1 to 100 moles of water are used for each mole of metalated limonene.

The novel compound III, 6-methyl-2-(4-methylcyclohex-3-en-1-yl)hept-1-en-4-ol, is further reacted with hydrogen to produce another novel compound IV as represented by the following:

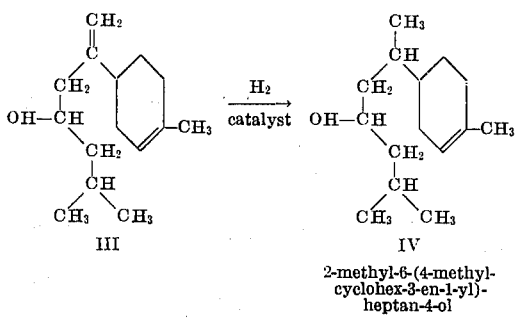

III

IV
2-methyl-6-(4-methyl-cyclohex-3-en-1-yl)-heptan-4-ol

The hydrogenation to compound IV can be effected in many ways. A preferred method of carrying out the reaction is under the influence of tris(triphenylphosphine)chlororhodium(I) as catalyst. Using this catalyst system, a mole ratio of compound III to catalyst of 4–40:1 is preferred. The most preferred amount of catalyst is 15:1 based on moles of compound III to moles of catalyst. Greater amounts of catalyst can be used but do not give any added advantages.

The preferred temperature using the tris(triphenylphosphine)chlororhodium(I) catalyst is room temperature (20° to 30° C) at atmospheric pressure. Higher temperatures or pressure should preferably be avoided because of the greater possibility of hydrogenating the double bond found in the ring structure in addition to the side chain double bond.

The hydrogenation reaction proceeds by adding the catalyst to the solution containing the compound III and thereafter passing hydrogen into the solution with stirring. The novel compound IV is obtained after distillation as a colorless liquid.

As previously mentioned, any catalyst system can be used in the hydrogenation reaction as long as it selectively hydrogenates only the side chain double bond of III.

Starting with d-limonene, the compound IV obtained by metalation of the said d-limonene and subsequent hydrogenation results in formation of a mixture of diastereomers having asymmetric carbon atoms at C–4, C–8, and C–11 based on the numbering system previously assigned. These diastereomers can be separated at this stage by various known techniques, or can remain mixed with separation being delayed until any of the later steps leading to juvabione. It is preferable not to separate the diastereomers until at least the next step in the synthesis leading to juvabione in that the oxidation of compound IV produces a compound, 2-methyl-6-(4-methyl-cyclohex-3-en-1-yl)heptan-4-one, that has asymmetric carbon atoms only at the C–4 and C–8 positions. Thus, a separation of the isomers after the oxidation would be more simple in that there are fewer diastereomers present. Most preferably though, the isomers are not separated at all, with the resulting juvabione being composed of a mixture of two diastereomers having 4R, 8S, and 4R, 8R stereochemistry. Since the natural juvabione has 4R, 8S sterochemistry, the mixture of synthesized diastereomers would show biological activity of at least 50 percent as compared to the naturally occurring juvabione.

It should be recognized that dl-limonene can also be used as the starting reagent, but additional separation steps are needed to obtain juvabione having the same stereochemistry as the naturally occurring juvabione.

As above mentioned, compound IV is further oxidized to produce a known compound V as represented by the following:

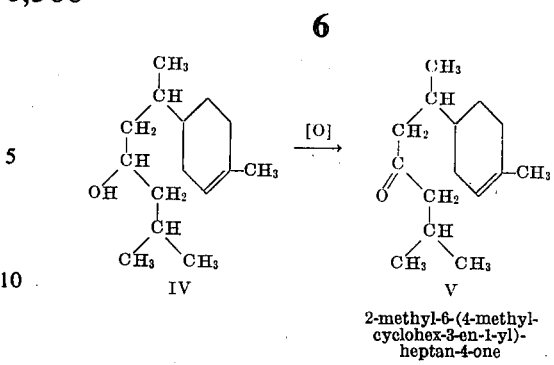

IV

V
2-methyl-6-(4-methyl-cyclohex-3-en-1-yl)-heptan-4-one

The oxidation of compound IV to the ketone V can be accomplished by many oxidation techniques. The preferred method of oxidation is accomplished with Jones reagent, i.e., chromic acid in sulfuric acid. Using this technique, compound IV is stirred at a reduced temperature while the Jones reagent is added dropwise. After the addition is complete the reaction mixture is poured into water and next extracted with ether. The ether solution is washed with aqueous sodium bicarbonate, e.g., 2 percent, aqueous sodium chloride, e.g., 5 percent, and then dried and evaporated. Compound V is then obtained as a colorless oil after distillation.

The above oxidation with Jones reagent is preferably performed at a reduced temperature. The preferred temperature range is −20° to 20° C. For each mole of compound IV, 1–3 moles of $CrO_3$ as Jones reagent is used with 1.5 moles preferred. Jones reagent comprises a mixture of $CrO_3$ and $H_2SO_4$ in a range 0.5 to 1 $CrO_3$ for each $H_2SO_4$.

The isomers of compound V can be separated by various techniques to obtain two diastereomers. It is preferred, however, not to separate the isomers and instead obtain a final product showing at least 50 percent biological activity.

The synthesis of juvabione from compound V is a known procedure as reported by Pawson, Cheung, Gurbaxani, and Saucy, *Chem. Commun.*, 1057 (1968). This synthesis is represented by the following schematic formulas:

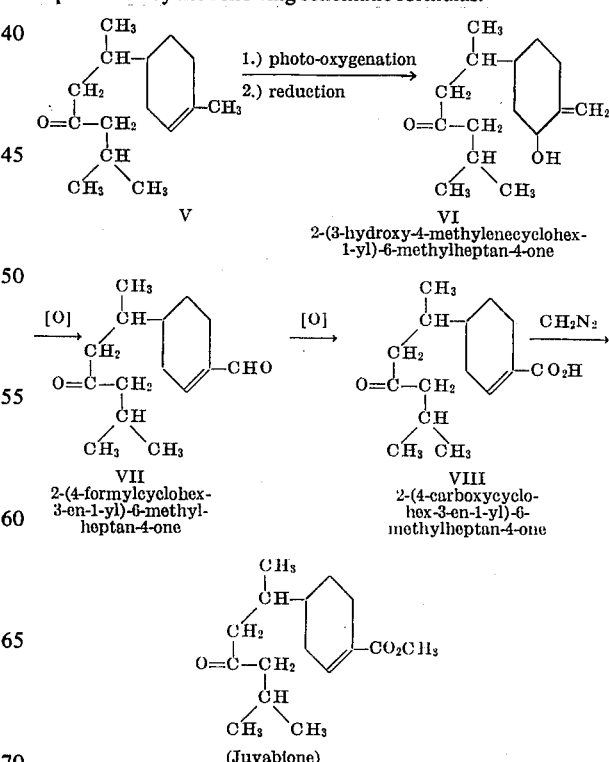

Compound V is first photo-oxidized and the reaction product then reduced to form compound VI. Compound VI is oxidized to form compound VII which is further oxidized to compound VIII. Compound VIII is then reacted with diazomethane to produce juvabione.

The following examples are given to illustrate the invention.

EXAMPLE I

6-methyl-2-(4-methylcyclohex-3-en-1-yl)-hept-1-en-4-ol

A solution of metalated limonene was prepared in the manner disclosed in the aforementioned Ser. No.. 888,893 from 50 ml (0.075 mole) of 1.5 M n-butyllithium in n-hexane, 11.3 ml (8.8 g, 0.076 mole) N,N,N',N'-tetramethylethylenediamine (TMEDA) and 25 ml (21.0 g, 0.154 mole) of d-limonene. That is, a flask fitted with a magnetic stirring bar and gas inlet tube was charged with the n-butyllithium solution. The contents of the flask were maintained under a blanket of argon at all times. TMEDA was added dropwise to the stirred solution. To the resulting solution was added the limonene dropwise. Stirring was continued for 1 hour and then the mixture was allowed to stand overnight at room temperature. The reaction flask was fitted with a low temperature thermometer and a pressure equalized addition funnel. The solution was stirred and cooled to −50° C while static argon atmosphere in the system was maintained; 10.0 ml (8.0 g, 0.093 mole) of freshly distilled isovaleraldehyde was added dropwise via the addition funnel. The rate of addition was adjusted so that the solution temperature did not exceed −20° C. The reaction mixture was allowed to warm to room temperature and 50 ml of water was added dropwise (mildly exothermic). The organic phase was diluted with ether and separated, and the aqueous solution was extracted with three additional portions of ether. The combined ether solutions were washed successively with 50 ml of 5 percent aqueous sodium chloride, two 75 ml portions of 0.5 M hydrochloric acid, 75 ml of 5 percent aqueous sodium chloride, and were dried and evaporated. Recovered limonene (9.6 g) was separated from the resulting liquid by distillation. Distillation of the residue through a short path apparatus yielded 10.14 g (61 percent, based on n-butyllithium) of 6-methyl-2-[4-methylcyclohex-3-en-1-(R)-yl]hept-1en-4-(RS)-ol as a colorless oil, bp 79°–101° (0.10 mm), glpc purity 88 percent. The analytical sample was purified by preparative glpc followed by molecular distillation.

EXAMPLE II

2-methyl-6-(4-methylcyclohex-3-en-1-yl)-heptan-4-ol

A solution of 0.91 g (4.1 mmoles) of 6-methyl-2-[4-methylcyclohex-3-en-1-(R)-yl]hept-1-en-4-(RS)-ol (purity 88 percent) and 0.28 g (0.30 mmole) of tris(triphenylphosphine)chlororhodium(I) in 100 ml of deoxygenated benzene was stirred under an atmosphere of hydrogen for a total of 270 minutes; the hydrogen uptake was 85 ml. The solution was flushed with nitrogen, filtered and evaporated. Molecular distillation of the residue gave 0.84 g (92 percent) of 2-methyl-6-(RS)-[4-methylcyclohex-3-en-1-(R)-yl]heptan-4-(RS)-ol as a slightly yellow oil. The analytical sample was obtained as a colorless oil after purification by preparative glpc followed by molecular distillation.

EXAMPLE III

2-methyl-6-(4-methylcyclohex-3-en-1-yl)-heptan-4-one

To a stirred solution of 0.115 g (0.51 mmole) of 2-methyl-6-(RS)-[4-methylcyclohex-3-en-1-(R)-yl]heptan-4-(RS)-ol (purity 78%) in 2 ml of acetone at 0° was added dropwise 0.28 ml of Jones reagent (2.67 M $CrO_3$ in 8.6 N $H_2SO_4$). The cooling bath was removed, the reaction mixture was allowed to stir for 3 min, and then was poured into water and extracted with three 35-ml portions of ether. The combined ether solutions were washed with 25 ml of 2 percent aqueous sodium bicarbonate and 50 ml of 5 percent aqueous sodium chloride, and were dried and evaporated to give 0.103 g (90 percent) of 2-methyl-6-(RS)-[4-methylcyclohex-3-en-1-(R)-yl]heptan-4-one as a yellow oil, glpc purity 77 percent. The analytical sample was obtained as a colorless oil after purification by preparative glpc followed by molecular distillation.

What is claimed is:

1. 6-Methyl-2-(4-methylcyclohex-3-en-1-yl)hept-1-en-4-ol.

* * * * *